United States Patent [19]
Knipe et al.

[11] Patent Number: 5,768,007
[45] Date of Patent: Jun. 16, 1998

[54] PHASE MATCHED RESET FOR DIGITAL MICRO-MIRROR DEVICE

[75] Inventors: Richard Knipe, McKinney; Rabah Mezenner, Richardson, both of Tex.; Douglas A. Webb, Phoenix, Ariz.

[73] Assignee: Texas Instruments Incorporated, Dallas, Tex.

[21] Appl. No.: 712,042

[22] Filed: Sep. 11, 1996

Related U.S. Application Data

[60] Provisional application No. 60/003,566 Sep. 11, 1995.
[51] Int. Cl.[6] .................................................. G02B 26/00
[52] U.S. Cl. ........................ 359/290; 359/224; 359/291; 427/534
[58] Field of Search .............................. 359/224, 214, 359/230, 291, 290, 846; 427/534, 162

[56] References Cited

U.S. PATENT DOCUMENTS

| | | | |
|---|---|---|---|
| 5,096,279 | 3/1992 | Hornbeck et al. | 359/230 |
| 5,202,785 | 4/1993 | Nelson | 359/214 |
| 5,583,688 | 12/1996 | Hornbeck | 359/291 |

*Primary Examiner*—Loha Ben
*Attorney, Agent, or Firm*—Charles A. Brill; James C. Kesterson; Richard L. Donaldson

[57] ABSTRACT

A method of resetting the mirrors (11, 21) of the mirror elements of a digital micro-mechanical device (DMD) (10, 20). A bias voltage is applied to the mirror elements and the surface upon which they land, but is removed after the address voltage has been switched. (FIG. 4). Immediately before the bias is removed, a reset voltage is added to the bias voltage. The reset voltage signal is comprised of a number of pulses at a frequency that matches the resonant frequency of the mirrors. The magnitude of the reset voltage results in a total applied voltage that permits vibrational energy to build but that is insufficient to cause the mirrors to become unstuck until the end of the reset signal. In other words, the magnitude of the reset voltage is small relative to that of the bias voltage.

18 Claims, 5 Drawing Sheets ically. 5,768,007

PHASE MATCHED RESET FOR DIGITAL MICRO-MIRROR DEVICE

This application is a continuation and claims priority of provisional application No. 60/003,566, filed Sep. 11, 1995.

TECHNICAL FIELD OF THE INVENTION

This invention relates to digital micro-mirror devices, and more particularly, to a method for resetting the mirror elements of such devices.

BACKGROUND OF THE INVENTION

A recent development in the field of electro-mechanics has been the miniaturization of various mechanical devices. Typical of such devices are tiny gears, levers, and valves. These "micro-mechanical" devices are manufactured using integrated circuit techniques, often together with electrical control circuitry. Common applications include accelerometers, pressure sensors, and actuators. As another example, spatial light modulators can be configured from micro-mechanical reflective mirror elements.

One type of micro-mechanical device is a digital micromirror device (DMD), sometimes referred to as a deformable mirror device. The DMD has an array of hundreds or thousands of tiny tilting mirrors. Light incident on the DMD is selectively reflected or not reflected from each mirror to an image plane, to form images. To permit the mirrors to tilt, each mirror is attached to one or more torsion hinges. The mirrors are spaced by means of air gaps, over underlying control circuitry. The control circuitry provides electrostatic forces, via address electrodes, which cause each mirror to selectively tilt.

For optimal operation of a DMD, each mirror should promptly return to its untilted (equilibrium) position when desired. For a given sticking force at the landing surface, it is possible to define a hinge restoration force that will free the mirrors from a landed state. However, due to other system considerations, such as the desire to operate the DMD at relatively low voltages, it may not be practical to increase the hinge stiffness to a point where all mirrors will reset automatically upon removal of the address signal.

Thus, to encourage the mirrors to reset without an unduly large hinge stiffness, a bias signal with an extra reset voltage has been applied to the address electrodes. U.S. Pat. No. 5,096,279, entitled "Spatial Light Modulator and Method," assigned to Texas Instruments Incorporated, describes the use of a reset pulse signal. In the past, both single pulse signals and multiple pulse signals have been tried. Neither has had entirely satisfactory results.

Two criteria must be met for an efficient DMD pixel reset signal. The waveform should be efficient enough to overcome stiction forces and it should be immune to visual artifacts such as twinkling.

SUMMARY OF THE INVENTION

One aspect of the invention is a method of resetting the mirrors of a micro-mirror device (DMD). More generally, the invention is a method of resetting movable elements of any micro-mechanical device, where the movable element is deflected toward a landing surface by means of a switchable address voltage. A bias voltage, either positive or negative, is applied to the movable element and the landing surface. This bias voltage is removed, typically after the address voltage has been switched. But before the bias is removed, a reset signal is added to the bias voltage. This reset signal has pulses with an amplitude that is small relative to the bias voltage and with a frequency that is substantially the same as the resonant frequency of the movable element. The reset signal may or may not include a final impulse, having a polarity in the direction of the bias but a magnitude greater than that of the other pulses.

An advantage of the invention is that the reset signal is more efficient per volt, in terms of unsticking mirrors, than single-pulse reset methods. Thus, the reset voltages need not be as high. At the same time, the reset signal avoids undesirable "twinkling effects" that occur with other pulse reset methods.

DETAILED DESCRIPTION OF THE INVENTION

For purpose of example, the following description is in terms of a particular type of micro-mechanical device, a "digital micro-mirror device" (DMD), sometimes also referred to as a "deformable mirror device." As described in the Background, a DMD is comprised of tiny hinged mirrors, each supported over a substrate of control circuitry. The invention is directed to an improved method of providing a reset pulse for restoring the mirrors to their equilibrium position after they have been tilted. However, the same concepts could apply to any micro-mechanical device having a movable element that moves in response to electrostatic attraction.

One application of DMDs is for forming images, where the DMD has an array of deflectable mirrors that selectively reflect light to an image plane. The images formed by the DMD can be used in display systems or for non-impact printing applications. Other applications of DMDs are possible that do not involve image formation, such as optical steering, optical switching, and accelerometers. In some of these applications, the "mirror" need not be reflective. Also, in some applications, the DMD is operated in an analog rather than a digital mode. In general, the term "DMD" is used herein to include any type of micro-mechanical device having at least one hinge-mounted deflectable element that is spaced by an air gap from a substrate, relative to which it moves.

Figure 1:
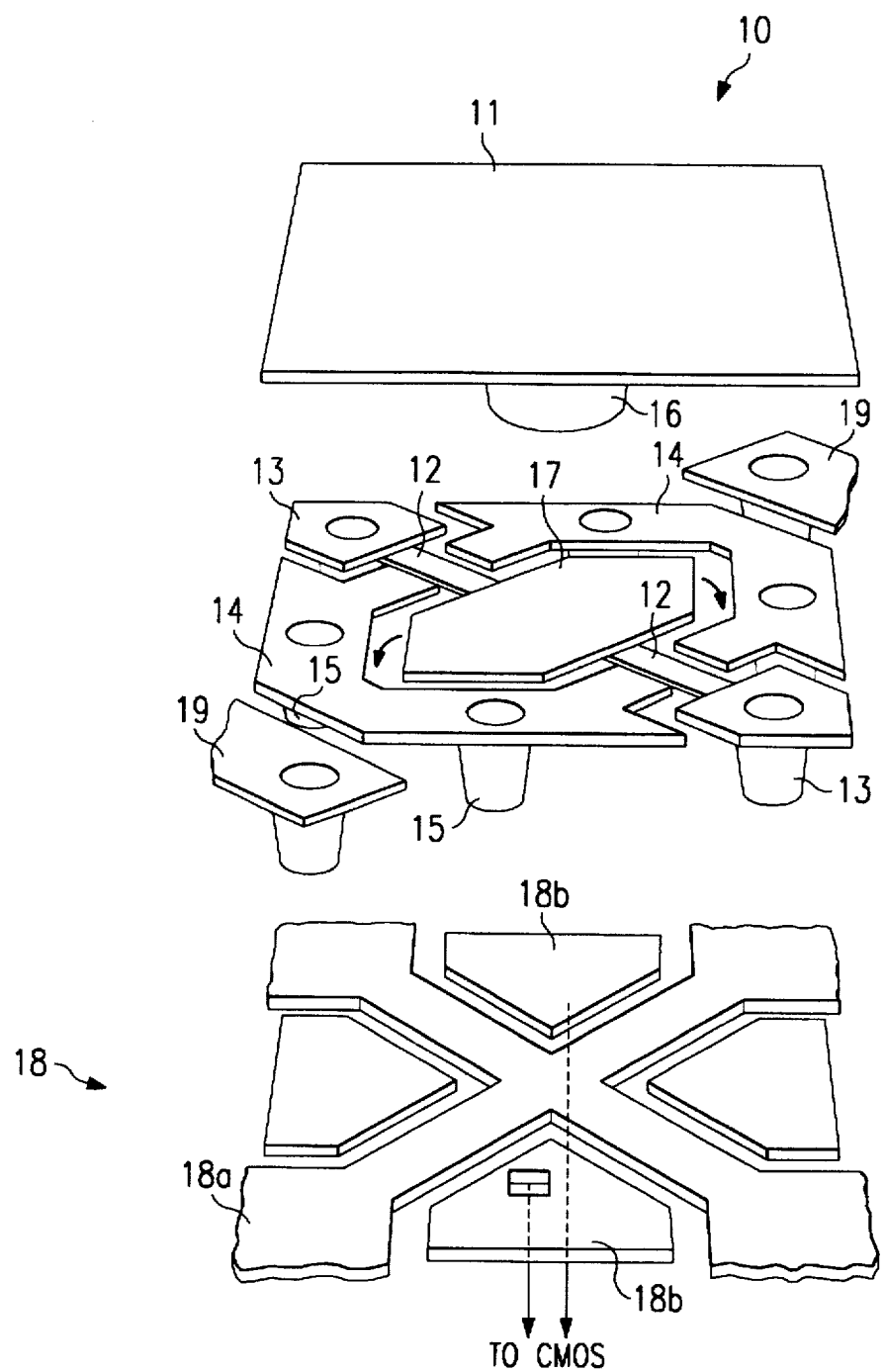
FIG. 1 is an exploded perspective view of a hidden hinge type mirror element of a digital micro-mirror device (DMD).

FIG. 1 is an exploded perspective view of a single mirror element 10 of a DMD. In FIG. 1, the mirror 11 is undeflected, but as indicated by the arrows, its torsion hinges 12 permit it to be deflected in either of two directions. As indicated above, various DMD applications may use such mirror elements 10 singly or in arrays.

The mirror element 10 of FIG. 1 is known as a "hidden hinge" mirror element. Other types of mirror elements 10 can be fabricated, including a "torsion beam" type, described below in connection with FIG. 2, where the mirror is mounted directly to the hinges instead of over a yoke to which the hinges are attached. Various DMD types are described in U.S. Pat. No. 4,662,74.6, entitled "Spatial Light Modulator and Method"; U.S. Pat. No. 4,956,610, entitled "Spatial Light Modulator"; U.S. Pat. No. 5,061,049 entitled "Spatial Light Modulator and Method"; U.S. Pat. No. 5,083,857 entitled "Multi-Level Deformable Mirror Device"; and U.S. Pat. No. 5,583,688, entitled "Multi-Level Digital Micromirror Device." Each of these patents is assigned to Texas Instruments Incorporated and each is incorporated herein by reference.

As with other hidden hinge DMD designs, the hinges 12 of mirror element 10 are supported by hinge support posts 13, which are formed on a substrate. Address electrodes 14 are supported by address electrode support posts 15, which are on the same level as hinges 12 and hinge support posts 13.

Mirror support post 16 is fabricated on a yoke 17. Yoke 17 is attached to one end of each of the two hinges 12. The other end of each hinge 12 is attached to a hinge support post 13. The hinge support posts 13 and the electrode support posts 15 support the hinges 12, address electrodes 14, and yoke 17 over a substrate having a control bus 18a. When mirror 11 is tilted, the tip of mirror 11 contacts a landing site 19. The address electrodes 14 have appropriate electrical connections to memory cells (not shown), which are typically fabricated within substrate 18 using CMOS fabrication techniques.

Figure 2:
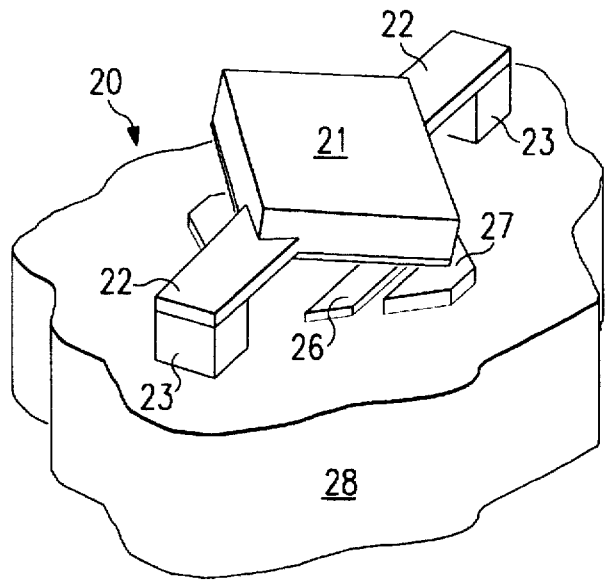
FIG. 2 is a perspective view of a torsion beam type mirror element of a DMD.

FIG. 2 illustrates a mirror element 20 of a "torsion beam" type DMD. The hinges 22 are not hidden, but rather extend from opposing sides of mirror 21. Hinges 22 are attached to hinge support posts 23. Address electrodes 26 provide attractive forces for tilting the mirror 21, which touches a landing pad 27. The mirror element 20 is fabricated over a substrate 28 of memory cells and control circuitry.

Many variations of the designs of FIGS. 1 and 2 are possible. For example, the yoke 17 (or mirror 21) could be notched so that the hinges 12 (or 22) are set in. The hinges 12 (or 22) could be attached at a side of yoke 17 (or mirror 21) as in FIG. 1 or at a corner as in FIG. 2. Furthermore, the hinge attachment need not be at opposing corners or sides. The hinges could be attached so as to permit asymmetric tilting.

In operation for image display applications, and using an array of mirror elements 20 for example, a light source illuminates the surface of the DMD. A lens system may be used to shape the light to approximately the size of the array of mirror elements 20 and to direct this light toward them. Voltages based on data in the memory cells of substrate 28 are applied to the address electrodes 26. Electrostatic forces between the mirrors 21 and their address electrodes 26 are produced by selective application of voltages to the address electrodes 26. The electrostatic force causes each mirror 21 to tilt either about +10 degrees (on) or about −10 degrees (off), thereby modulating the light incident on the surface of the DMD. Light reflected from the "on" mirrors 21 is directed to an image plane, via display optics. Light from the "off" mirrors 21 is reflected away from the image plane. The resulting pattern forms an image. The proportion of time during each image frame that a mirror 21 is "on" determines shades of grey. Color can be added by means of a color wheel or by a three-DMD setup.

In effect, the mirror 21 and its address electrodes 26 form capacitors. When appropriate voltages are applied to mirror 21 and its address electrodes 26, a resulting electrostatic force (attracting or repelling) causes the mirror 21 to tilt toward the attracting address electrode 26 or away from the repelling address electrode 26. The mirror 21 tilts until its edge contacts landing pad 27. Once the electrostatic force between the address electrodes 26 and the mirror 21 is removed, the energy stored in the hinges 22 provides a restoring force to return the mirror 21 to an undeflected position. Appropriate voltages may be applied to the mirror 21 or address electrodes 26 to aid in returning the mirror 21 to its undeflected position.

Figure 3:
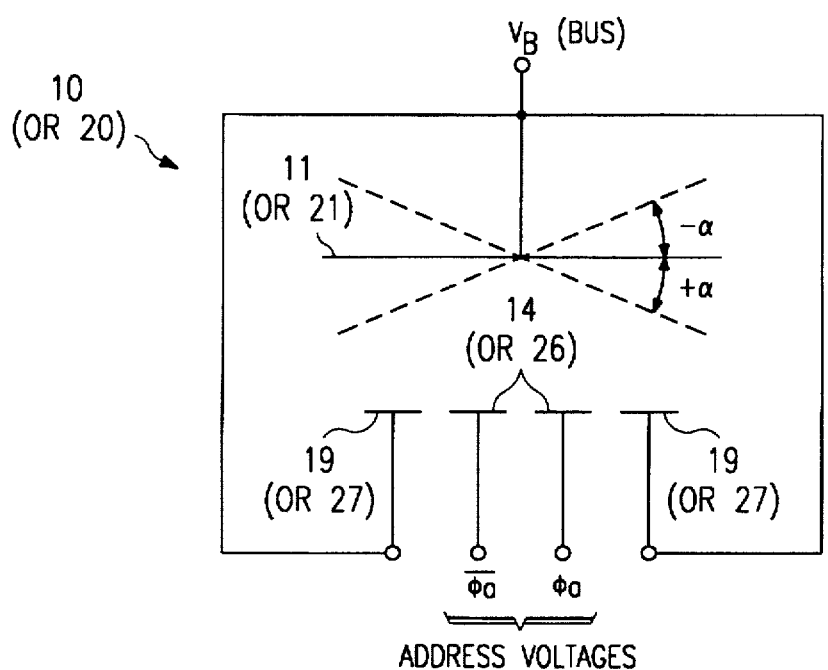
FIG. 3 is a schematic cross sectional view of portions of the mirror element of FIG. 1 or of FIG. 2.

FIG. 3 is a schematic cross sectional view of a portion of mirror element 10 (or 20) and its operating voltages. Depending on the state of its underlying memory cell, each mirror 11 (or 21) is attracted by a combination of bias and address voltages to one or the other of the address electrodes 14 (or 26). It rotates until its tip touches a landing site 19 (or 27), which is held at the same potential as the mirror by the bias voltage. The complementary address voltages, $\phi_a$ and $\bar{\phi}_a$, are switched back and forth and held while the data is being displayed (the bit period). A typical tilt angle, $+\alpha$ or $-\alpha$, is 10 degrees. In other types of DMD's, the yoke 17 contacts a landing site on the substrate, rather than the mirror contacting a landing site. The invention described herein is applicable to these types of DMD's, with the yoke being equivalent to the mirror for purposes of applying the reset pulse in accordance with the invention.

Figure 4:
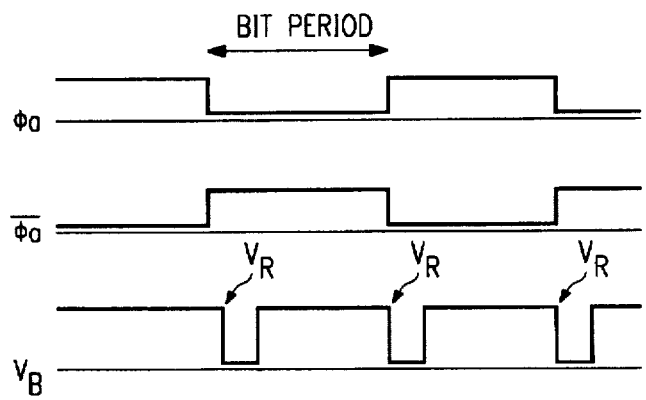
FIG. 4 illustrates the timing relationship of the address and bias voltages of FIG. 3, as well as of the reset signal.

FIG. 4 illustrates the relationship of the address and bias voltages. The address voltages, $\phi_a$ and $\bar{\phi}_a$, are complementary and remain on or off during the bit period. Typical address voltages are 0 and 5 volts. After every switch of the address voltages, the bias voltage, $V_B$, is turned off then on. This is designed to permit the mirror to return to its flat state (reset) and to then tilt to its new state. In FIG. 4, the bias voltage is positive. A typical bias voltage is 12 volts, and a typical bias off time is 3–5 microseconds. As stated in the Background, an extra amplitude of voltage is often added to the bias at points $V_R$ to encourage the mirrors to reset. This extra voltage, referred to herein as the "reset signal," is added just before the bias is turned off. The invention is directed to a method of providing an optimal reset signal. The "reset position" can be flat or could be deflected to the other address electrode. The invention could be used to reset a mirror or other micro-mechanical element that tilts in only one direction.

One aspect of the invention is the recognition that with prior reset signals, in particular, those that use multiple pulses, a mirror (or yoke) that becomes free before the final pulse can reattach to the landing surface. This reattachment can be perceived as a "twinkling" effect. Although a single-pulse reset signal at a sufficiently high voltage could eliminate the twinkling, the use of a single pulse is inefficient and higher voltages are required than with resonant pulses.

Figure 5:
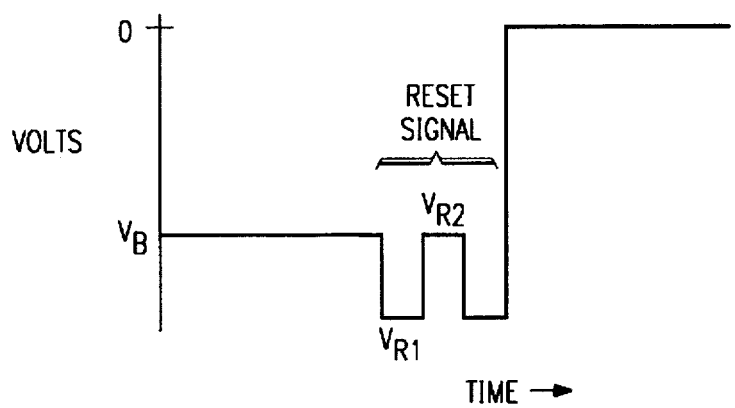
FIG. 5 illustrates a reset signal in accordance with the invention, used with a negative bias.

FIG. 5 illustrates a reset signal in accordance with the invention, as applied to a negative bias voltage. In this embodiment, the reset signal is comprised of two resonant pulses. The bias is maintained during the reset signal. The amplitude of the reset pulses is small relative to the bias voltage and is near the level of the bias. Their polarity is the same as the bias, such that the total amplitude of the voltage is increased. In FIG. 5, $V_{R1}$ is less than $V_B$, and $V_{R2}$ is the same as $V_B$. It is also possible that $V_{R2}$ could be less than $V_B$.

A typical duration of the pulses is about one-half microsecond. The resonant frequency is determined by the structure of the mirror element, and can be determined experimentally. Typical resonant frequencies for DMD devices such as those currently being manufactured by Texas Instruments Incorporated are in the order of 2–5 MHZ.

Figure 6:
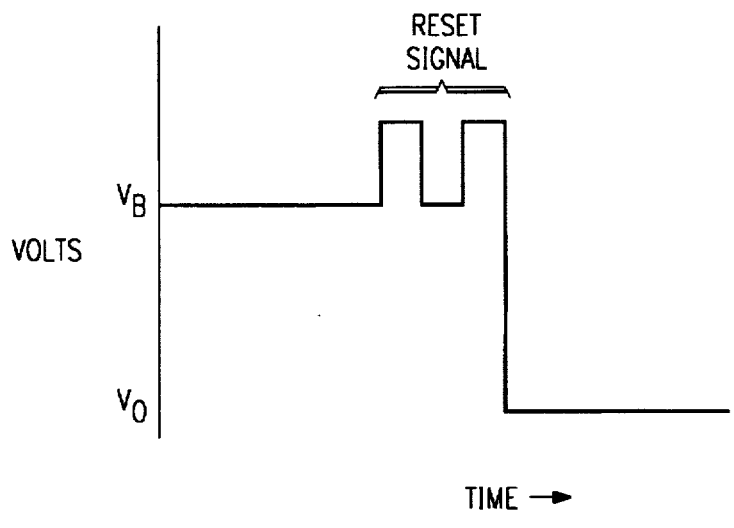
FIG. 6 illustrates a reset signal in accordance with the invention, used with a positive bias.

FIG. 6 illustrates another reset signal, which is like that of FIG. 5, except that the bias voltage is positive. The reset pulses have a polarity in the positive direction, which is the same as the bias. As in FIG. 5, the amplitude of the resulting total voltage is increased.

Figure 7:
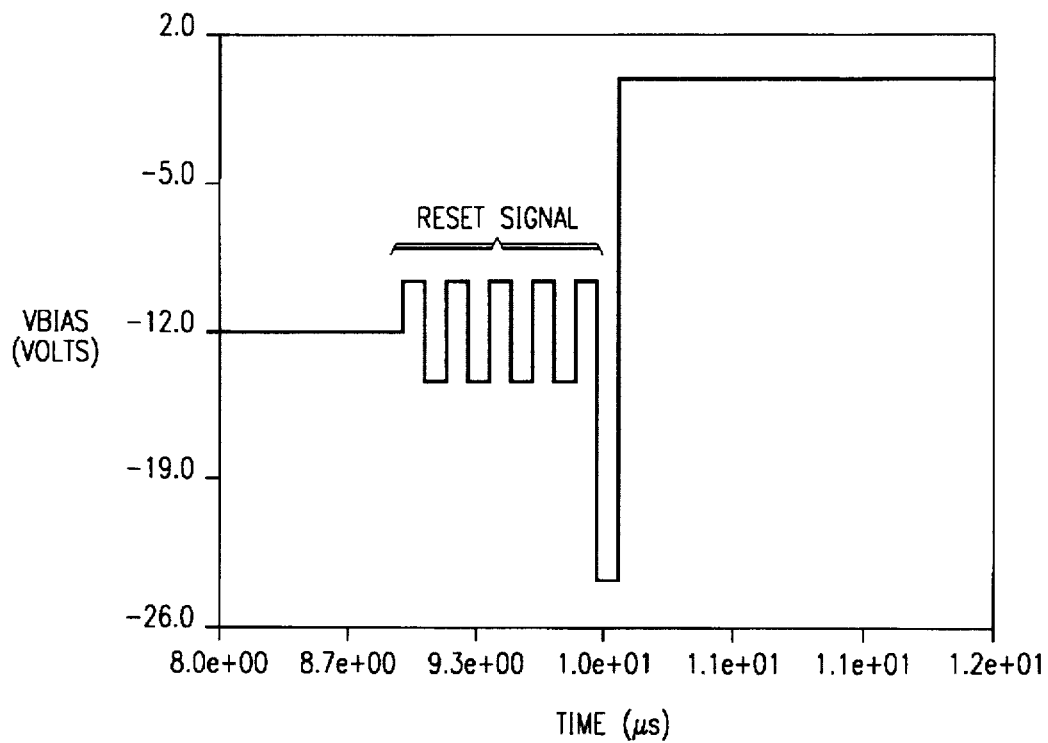
FIG. 7 illustrates an alternative reset signal in accordance with the invention, used with a negative bias and having an impulse.

FIG. 7 illustrates another reset signal in accordance with the invention. In FIG. 7, the bias is negative, with an amplitude of −12 volts. The reset signal is comprised of resonant excitation pulses combined with a single impulse. The excitation pulses are at a voltage near the bias voltage, and the impulse has a larger magnitude than the preceding pulses. The impulse is applied in phase with the excitation pulses. The bias voltage is applied during the pulses and is released with the impulse. The polarity of the pulses is such that the average voltage is the same as the bias. The polarity of the impulse is the same as that of the bias and results in a voltage magnitude larger than that of the bias.

For purposes of example, FIG. 7 illustrates a reset signal having five pulses prior to the final impulse. For a bias difference of 12 volts, each pulse has a magnitude of about 2.5 volts more or less than the bias. The impulse has a magnitude of about −12 volts, resulting in a total voltage of about −24 volts.

Figure 8:
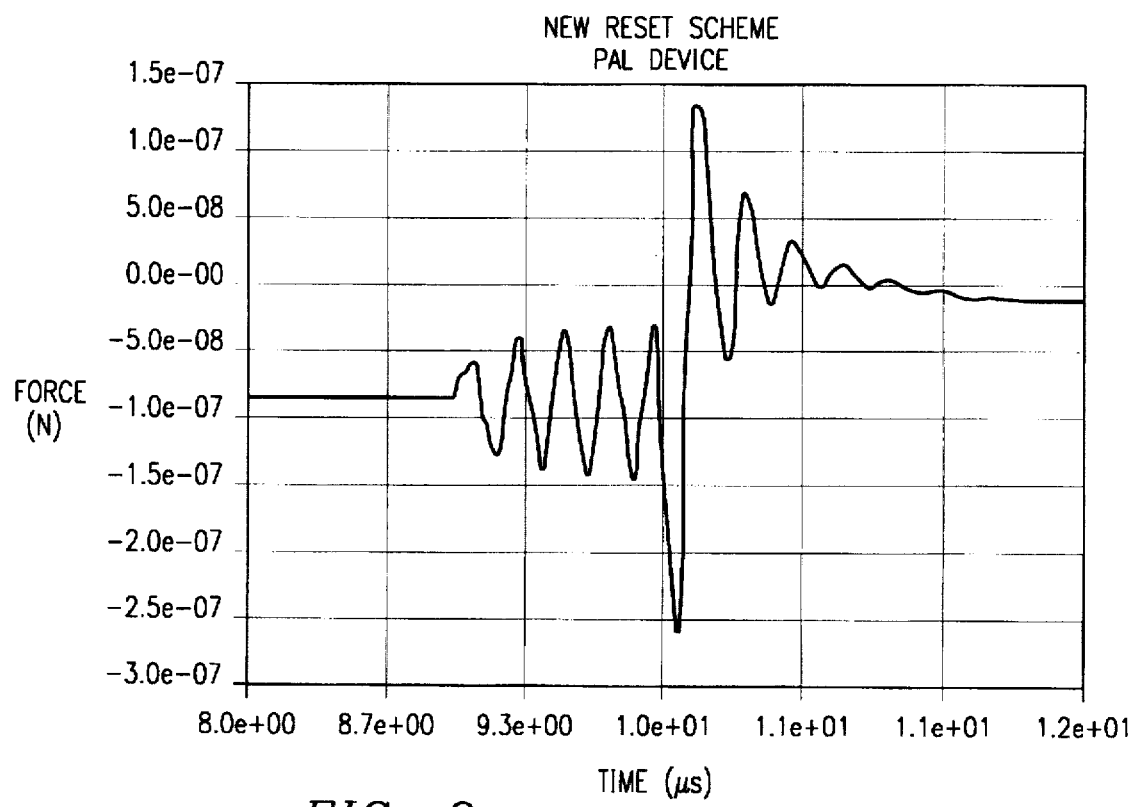
FIG. 8 illustrates the landing tip separation force during the reset signal of FIG. 7.

FIG. 8 illustrates the calculated landing tip separation force during the reset signal of FIG. 7. The calculation assumes that the landing tip of the mirror remains attached even after the final impulse, which facilitates the calculations. Under normal operation, the landing tip should break free at the impulse and the remainder of the calculation would be invalid. The amplitude of the pulses relative to the bias and the number of pulses are selected such that a net negative force is maintained on the mirror tip until the final impulse. The force from the pulses is insufficient to allow for release of the mirrors from the landing surface, and thus the mirrors remain tilted until the reset signal is complete. The resonant vibration resulting from the pulses allows the buildup of energy, which is released with the final impulse. This resonant energy enhances the ability of any stuck mirrors to break free of the landing surface. In general, as more pulses at a given amplitude are applied, the energy increases.

Figure 9:
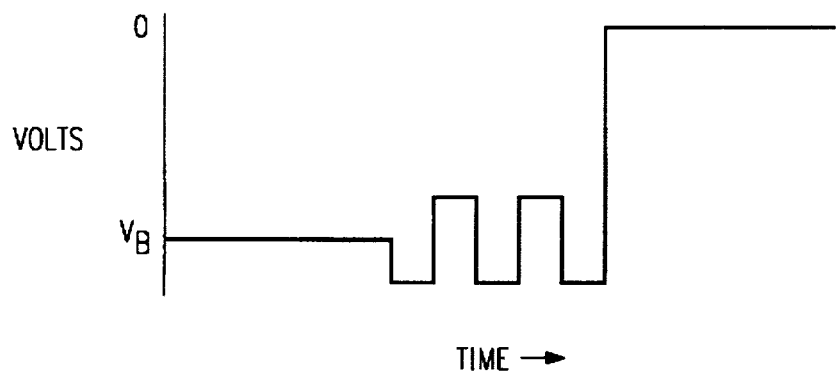
FIGS. 9 and 10 illustrate additional alternative reset signals in accordance with the invention.

FIG. 9 illustrates another reset signal, which is similar to that of FIG. 5 in that it does not have an impulse at the end of the reset signal. However, the pulses of the reset signal vary above and below the bias, so that the average voltage during the reset signal is maintained at the bias level.

Figure 10:
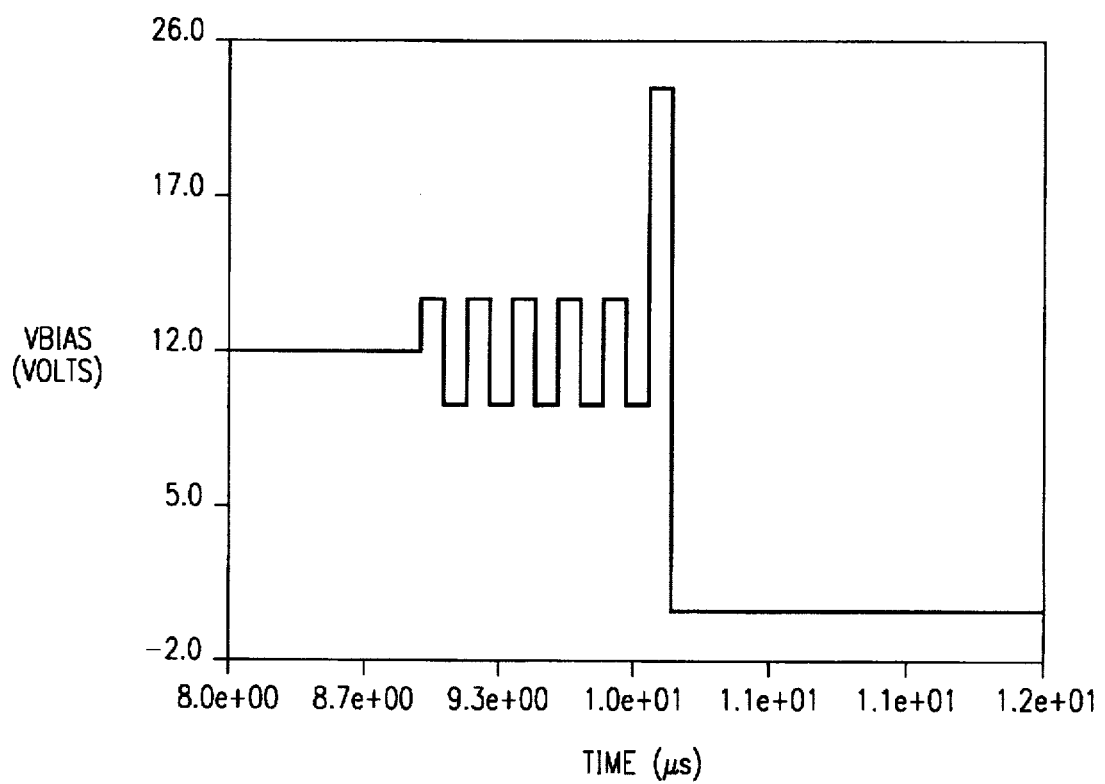

FIG. 10 illustrates a reset signal applied to a positive bias. Otherwise, the reset signal is analogous to that of FIG. 7.

In all of the above reset schemes, the reset signal is comprised of two or more resonant pulses, which are added to the bias voltage, with or without a final impulse. The amplitude of the pulses is near the bias level. The bias is applied until the final impulse, if any. The final impulse, if there is one, is in the direction of the bias. Thus, if the bias is positive, the impulse results in increased positive voltage; if the bias is negative, the impulse results in increased negative voltage. The pulses maintain the mirror in a vibrational mode while keeping the net force near that provided by the bias. As a result, any stuck mirrors do not become unstuck until the end of the reset signal, and therefore do not have an opportunity to become restuck.

Experimentation has shown that a particular DMD device may perform optimally with a certain reset pattern. For example, for a "hidden hinge" device, such as that of FIG. 1, the 2-pulse pattern of FIG. 5 has good results. For a "torsion beam" device, such as that of FIG. 2, a 3-pulse pattern has good results. In both cases, the pattern was evaluated in terms of efficiency as well as reduction of twinkling.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of resetting a movable element of a micro-mechanical device, said movable element being attracted toward a landing surface by means of an address voltage, and said movable element having a known resonant frequency, comprising the steps of:

applying a bias voltage to said movable element and said landing surface;

switching said address voltage;

adding a reset voltage to said bias voltage, said reset voltage having pulses with a magnitude that is small relative to that of said bias voltage and with a frequency that is substantially the same as the resonant frequency of said movable element; and removing said bias voltage until said moveable element is reset.

2. The method of claim 1, wherein said adding step further includes pulsing said reset voltage with a final impulse whose magnitude is greater than that of said pulses.

3. The method of claim 2, wherein said final impulse has a polarity that is the same as that of said bias voltage.

4. The method of claim 1, wherein said pulses have a polarity that is the same as that of said bias voltage.

5. The method of claim 1, wherein said pulses have a polarity that is such that the average voltage during said reset voltage is substantially the same as said bias voltage.

6. The method of claim 1, wherein said pulses have a polarity that is such that the magnitude of the average voltage during said reset voltage is less than that of said bias voltage.

7. The method of claim 1, wherein said micro-mechanical device is a digital micro-mirror device.

8. The method of claim 7, wherein said reset voltage has two said pulses.

9. The method of claim 7, wherein said reset voltage has three said pulses.

10. A method of resetting a mirror element of a digital micro-mirror device (DMD), said mirror element being tilted toward a landing surface by means of an address voltage under said mirror element and said mirror element having a known resonant frequency, comprising the steps of:

applying a bias voltage to said mirror element and said landing surface;

switching said address voltage;

adding a reset voltage to said bias voltage, said reset voltage having pulses with a magnitude that is small relative to said bias voltage and with a frequency that is substantially the same as the resonant frequency of said mirror element; and removing said bias voltage until said moveable element is reset.

11. The method of claim 10, wherein said DMD is a hidden-hinge type DMD having a yoke under said mirror element that contacts said landing surface, and wherein said bias voltage is applied to said yoke.

12. The method of claim 10, wherein said adding step further includes pulsing said reset voltage with a final impulse whose magnitude is greater than that of said pulses.

13. The method of claim 12, wherein said final impulse has a polarity that is the same as that of said bias voltage.

14. The method of claim 10, wherein said pulses have a polarity that is the same as that of said bias voltage.

15. The method of claim 10, wherein said pulses have a polarity that is such that the average voltage during said reset voltage is substantially the same as said bias voltage.

16. The method of claim 10, wherein said pulses have a polarity that is such that the average voltage during said reset voltage is less than said bias voltage.

17. The method of claim 10, wherein said pulses have a number and magnitude such that there is insufficient force to reset said moveable element at the beginning of said reset voltage.

18. The method of claim 10, wherein said bias voltage is removed immediately after the final pulses of said pulses.

* * * * *